United States Patent
Pandya et al.

(10) Patent No.: US 9,805,714 B2
(45) Date of Patent: Oct. 31, 2017

(54) DIRECTIONAL KEYWORD VERIFICATION METHOD APPLICABLE TO ELECTRONIC DEVICE AND ELECTRONIC DEVICE USING THE SAME

(71) Applicant: ASUSTeK COMPUTER INC., Taipei (TW)

(72) Inventors: Bhoomek D. Pandya, Taipei (TW); Hsing-Yu Tsai, Taipei (TW); Min-Hong Wang, Taipei (TW); Cheng-Chung Hsu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/076,682

(22) Filed: Mar. 22, 2016

(65) Prior Publication Data

US 2017/0278512 A1    Sep. 28, 2017

(51) Int. Cl.
*G10L 21/02* (2013.01)
*G10L 15/08* (2006.01)
*G10L 21/0208* (2013.01)
*G10L 25/84* (2013.01)
*G10L 15/02* (2006.01)

(52) U.S. Cl.
CPC ............. *G10L 15/08* (2013.01); *G10L 15/02* (2013.01); *G10L 21/0208* (2013.01); *G10L 25/84* (2013.01); *G10L 2015/088* (2013.01); *G10L 2021/02082* (2013.01)

(58) Field of Classification Search
CPC ................ G10L 21/0208; G10L 25/84; G10L 2015/088; G10L 2021/02082
See application file for complete search history.

(56) References Cited

U.S. PATENT DOCUMENTS

| | | | |
|---|---|---|---|
| 6,937,980 B2 | 8/2005 | Krasny et al. | |
| 2007/0136062 A1* | 6/2007 | Braunschweiler | G10L 13/10 704/253 |
| 2008/0172224 A1* | 7/2008 | Liu | G10L 15/187 704/220 |
| 2009/0240488 A1* | 9/2009 | White | G06F 3/0236 704/9 |

(Continued)

FOREIGN PATENT DOCUMENTS

| | | |
|---|---|---|
| CN | 202512515 | 10/2012 |
| TW | 201517017 | 5/2015 |

*Primary Examiner* — Qian Yang
(74) *Attorney, Agent, or Firm* — JCIPRNET

(57) ABSTRACT

The disclosure is directed to a directional keyword verification method and an electronic device using the same method. According to an exemplary embodiment, the proposed keyword verification method would include receiving an audio stream; analyzing the audio stream to obtain at least a word; determining whether the word matches a key word from a keyword database; assigning the word as a filler if the word does not match the keyword from the keyword database; determining whether a vowel pattern of the word matches the vowel pattern of the keyword if the word matches the key word from the keyword database; assigning the first word as a trigger or command word if the vowel pattern of the word matches the vowel pattern of the key word; and otherwise assigning the word as a filler if the vowel pattern of the word does not match the vowel pattern of the key word.

18 Claims, 9 Drawing Sheets

(56) References Cited

U.S. PATENT DOCUMENTS

| | | | |
|---|---|---|---|
| 2011/0208513 A1* | 8/2011 | Nicks | G06F 17/2705 704/10 |
| 2012/0259619 A1* | 10/2012 | Hall | G06F 17/2785 704/9 |
| 2013/0054234 A1* | 2/2013 | Kim | G10L 21/0208 704/226 |
| 2014/0046858 A1* | 2/2014 | Werner | G06Q 30/01 705/304 |

* cited by examiner

DIRECTIONAL KEYWORD VERIFICATION METHOD APPLICABLE TO ELECTRONIC DEVICE AND ELECTRONIC DEVICE USING THE SAME

TECHNICAL FIELD

The disclosure is directed to a directional keyword verification method applicable to an electronic device and an electronic device using the same method.

BACKGROUND

At the present, the technology for accurate keyword detections still has plenty of room for improvements. Detections of one or a series of keywords from audio signals could be used for various purposes which may include storage, transmission, speech recognition, speaker identification, and so forth. For example, a keyword detection mechanism could be useful for an application in which an electronic device could be controlled remotely by a human voice. After audio signals have been captured, signal processing algorithm is required to discern not only the exact words being uttered but also possibly the grammar or sentence structures. Currently, better implementations of algorithms to improve the signal quality is still needed to increase the quality and accuracy of the keyword detections. Discernment of exact words currently can be performed by an automatic speech recognition (ASR) engine.

A current keyword detection method may have various difficulties which would need to be addressed. For example, the result of a state of the art ASR engine is still not very accurate, and thus a post recognition algorithm could be required. Also it is important to judge the presence of user in a desired direction from the microphone and to remove other interference from undesired direction. Also this means that the recording device can be continuously listening to desired direction and will not be triggered in to action by noise from other directions. For real time applications, reducing computation time is of high priority and also for constant computation time, a good buffering strategy is needed.

Moreover, the presence of non-human speech such as background music would need to be eliminated. After a human speech is captured, the effects of the playback sound from a speaker installed for an electronic device may introduce unwanted echo to a keyword verification system. The unwanted echo would also need to be eliminated. Furthermore, a verification procedure is needed to discern whether a user is having a conversation with another user or the user is actually issuing a voice command.

Since the above mentioned challenges would need to be addressed, a novel keyword verification method and a keyword verification system could be needed.

SUMMARY OF THE DISCLOSURE

Accordingly, the disclosure is directed to a directional keyword verification method applicable to an electronic device and an electronic device using the same method.

According to one of the exemplary embodiments, the disclosure proposes a keyword verification method applicable to an electronic device, and the method would include not limited to: receiving a first audio stream; analyzing the first audio stream to obtain a first word; determining whether the first word matches a first key word from a keyword database; assigning the first word as belonging a first category in response to the first word being determined as not matching the first keyword from the keyword database; determining whether a vowel pattern of the first word matches the vowel pattern of the first keyword in response to the first word being determined as matching the first key word from the keyword database; assigning the first word as belonging to a second category in response to the vowel pattern of first word being determined as matching the vowel pattern of the first key word; and assigning the first word as belonging to the first category in response to the vowel pattern of first word being determined as not matching the vowel pattern of the first key word.

The disclosure proposes an electronic device which would include not limited to: at least two microphones for receiving a first audio stream; and a processor indirectly coupled to the at least two microphones and is configured at least for: analyzing the first audio stream to obtain a first word; determining whether the first word matches a first key word from a keyword database; assigning the first word as belonging a first category in response to the first word being determined as not matching the first keyword from the keyword database; determining whether a vowel pattern of the first word matches the vowel pattern of the first keyword in response to the first word being determined as matching the first key word from the keyword database; assigning the first word as belonging to a second category in response to the vowel pattern of first word being determined as matching the vowel pattern of the first key word; and assigning the first word as belonging to the first category in response to the vowel pattern of first word being determined as not matching the vowel pattern of the first key word.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
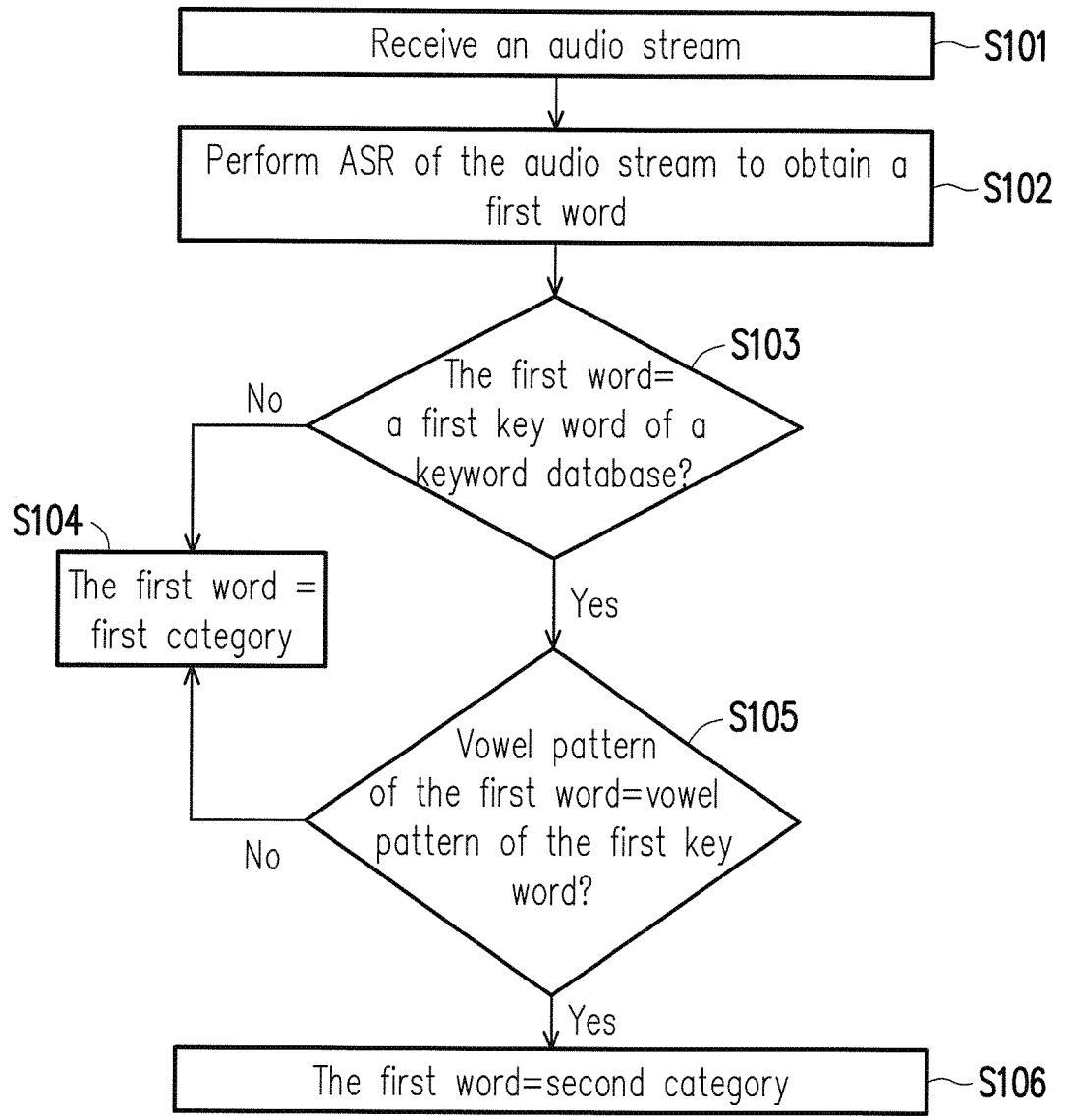
FIG. 1 is a flow chart which illustrates the proposed method of directional keyword verification method in accordance with one of the exemplary embodiment of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

Key word detection in audio signal has widely known applications for controlling processes using audio commands. Most application use speech recognition and design specific finite spoken words based search domain. The disclosure pertains to keyword detection in audio signal which is captured by two or more microphones. The proposed method is directional selective. The captured audio signal could be used in the field of speech recognition, speaker identification, voice activated control, and so forth. The captured audio signal from multiple microphones would be identified by using an automatic speech recognition (ASR) engine. However, the result of the ASR engine might not be totally accurate and thus a subsequent verification based on the type of vowels and timestamp of the vowels is proposed. Also, there has to be a mechanism that would be able to distinguish between a voice command issued to a machine and mundane conversations among people. Therefore, the recognized word from the ASR engine would subsequently require additional verifications by discerning specific language pattern such as specific syntax or artificial grammars.

The captured audio signal by multiple microphones would be digitized processed an algorithm to improve the signal quality as such algorithm is needed to increase the quality and accuracy of keyword detections. Also, it could be important to judge the presence of user in a desired direction from the microphone in order to remove interferences from undesired direction. This means that a recording device may continuously record audio signals from a desired direction and will not trigger any action by audio signals outside of the designated directions. Moreover, for real time applications, reducing computation time could also be a high priority; and also for constant computation time, a good buffering strategy is needed. Considering these important criteria, the disclosure proposes a method and device for detecting the presence of one or more users in a desired direction based on keywords or phrases detected from the designated direction. The proposed method and device would first detect these key words and subsequently verifying them by using vowel onset locations in a spoken speech.

In addition, the disclosure aims at using beamforming to solve the problem related to background noise cancellation, and voice activity detection (VAD) would also be used. Also a general automatic speech recognition (ASR) engine could be used to continuously search for the audio pattern in a predefined grammar. The grammar could be custom defined to increase the probability of rejecting out of vocabulary words. A Formant analysis of the words captured by the ASR engine may include vowel onset point detection and vowel recognition based on formants.

The effects of the playback sound is removed from the speaker on the device by using echo cancellation mechanism. The processed signal is then passed to the audio to an AGC (automatic gain control) module to fix the gain to a predefined level. The usage of AGC would improve the decision making thresholds in the rest of the technology blocks by stabilizing the gain. Further with multiple microphones, beamforming could be used to mask undesired directional noise and thus would lead to a single channel audio stream which is then optionally passed through a background noise cancellation module. The undesired and desired direction for beamforming can be dynamically adjusted by software. In this way, it is possible to define a new desired or undesired direction could be defined for every utterance.

Following the above signal processing, the presence of human voice in the recorded audio (voice activity detection—VAD) could be detected. With this mechanism, random noises could be differentiated from human voice. The detected human voice could then passed through a voice recognition module which is optimized to detect finite/specific grammar patterns in audio. The detected pattern may include a key word which is needed to spot a given utterance, along with other similar phrases. The customized grammar could also assist the keyword verification system to locate approximate time stamp location of the key word/phrase in the spoken utterance along with it's phonetic breakup.

The spotted key word is further verified based on the location of specific phonemes. The Formant analysis would be used to locate vowel onset points along with formant frequencies of the vowels. The result of the formant analysis would then be verified against the result of the ASR engine. Based on location and detection of the vowel segments, a key word can be correctly verified.

Figure 5:
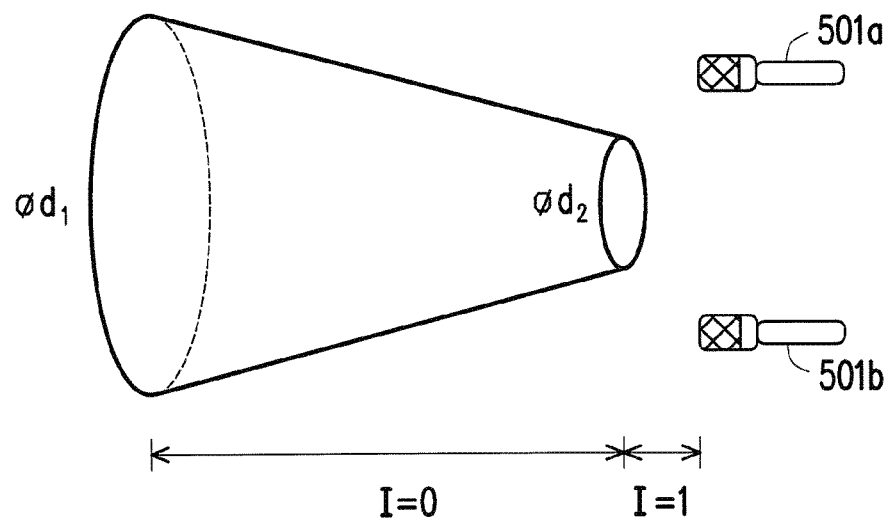
FIG. 5 is a conceptual diagram that illustrates defining a cone having an acceptance angle and a capturing distance in accordance with one of the exemplary embodiments of the present disclosure.

The goals of the disclosure would include detecting the key word in a spoken utterance and enhancing the key word detection via audio enhancement, directional audio selectivity, and utterance verification. Thus in this disclosure, the angle of acceptance could be specified for the audio signal when multiple microphones are available to capture sound. This is contrary to the single microphone capture, where the capture area is omni-directional. The distance from the microphone (capture distance) may thus be specified to form the capture cone from which capturing directions and distance of sound are specified as shown in FIG. 5. If the source of audio is beyond this cone, the audio could be neglected from it. Therefore, the intended user may need to be within this cone of acceptance for his audio to be captured. The angle of acceptance could be confirmed by finding the direction of arrival of sound. The capture distance could be measured on the basis of signal strength and the confidence in the angle measurement module. The captured audio could further be optionally enhanced by using background noise removal. The audio would then be passed through a voice activity detection (VAD) and speech recognition module. A key word or phrase is then considered to have been detect once it is verified by using formant analysis and phoneme time stamp information from the speech recognition engine.

FIG. 1 is a flow chart which illustrates the proposed method of directional keyword verification method in accordance with one of the exemplary embodiment of the disclosure. In step S101, an electronic device would receive an audio stream, which could be received from desired spatial direction by two or more microphones or from other external sources. In step S102, the electronic device may input the audio stream into an ASR engine in order to discern one or more words. The technology of automatic speech recognition is currently known by ordinary persons skilled in the art. In step S103, the electronic device would determine whether at least a word (e.g. a first word) which was recognized by the ASR engine would match a keyword in a keyword database. The keyword database could be, for example, a database of keywords which include a variety of keyword commands to control the electronic device, one or more trigger word to trigger the electronic device to listen to the command, security information such as user identification and passwords, and other grammatical or connective phrases. In step S104, if the electronic device has determined that the first word detected by the ASR engine is not any of the words in the keyword database, then the first word would be categorized as a first category (e.g. a filler word or non-trigger word) which includes words that has minimal impact on the keyword verification system. In step S103, if the electronic device has determined that the first word detected by the ASR engine is in fact a keyword of the keyword database, then step S105 will be performed. In step S105, the electronic device would determine whether the vowel pattern of the first word matches the vowel pattern of a keyword (e.g. the first keyword) in the keyword database. If so, in step S106 then the first word could be categorized as a second category which include words that include a variety of keyword commands as aforementioned; otherwise, the first word could be categorized as the first category e.g. a filler word) if the vowel pattern of the first word does not match the vowel pattern of the first keyword.

In one of the exemplary embodiment, the step of S103 may include: determining whether the vowel pattern of first word as matching the vowel pattern of the first key word based on a vowel sequence of the first word matching exactly with a vowel sequence of the first key word; and a timestamp of a vowel of the vowel sequence of the first word falls within an expected range which is determined based on a corresponding vowel of the vowel sequence of the first keyword.

In one of the exemplary embodiment, the first category is a filler word; and the second category is a trigger word or a command word.

In one of the exemplary embodiment, the step S106 would include determining whether a first word is a trigger word and subsequently determining whether a second word is a command word from the keyword database only if the first word is determined to be the trigger word.

In one of the exemplary embodiment, the electronic device may receive a second audio stream. After that, the electronic device would perform a voice activity detection (VAD) procedure to determine whether the second audio stream is a human speech. The second audio stream would be dismissed if the audio stream is not a human speech.

In one of the exemplary embodiment, step S101 may include capturing the first audio stream by using at least two microphones; applying an echo cancellation procedure to the first audio stream; and applying an automatic gain control (AGC) to the first audio stream to generate a gain adjusted first audio stream that is within a predetermined power level.

In one of the exemplary embodiment, step S101 may further include calculating a linear predictive coding (LPC) residue of the gain adjusted first audio stream; determining from the LPC residue a direction of the first audio stream relative to the at least two microphones based on time difference of arrival (TDOA); and masking in time and frequency of any sound at any direction that is outside of a predefined angle.

In one of the exemplary embodiment, the step of masking any sound source at any direction that is outside of the predefined angle may include filtering out any sound that is outside of the predefined angle; and filtering out any sound that is beyond a maximum distance.

In one of the exemplary embodiment, in step of S102 in which determining whether the first word matches a first key word from a keyword database may include dividing the first audio stream into phonemes; performing a formant analysis of the phonemes to detect formants and the time stamp of the vowels; and verifying the first word based on the formants and the time stamp of the vowels.

In one of the exemplary embodiment, in step of S102 in which analyzing the first audio stream to obtain a first word may include analyzing the first audio to detect the first word from a first angle; and analyzing the first audio to detect a different word from a second angle so that different words could be analyzed and verified from different directions.

Figure 2:
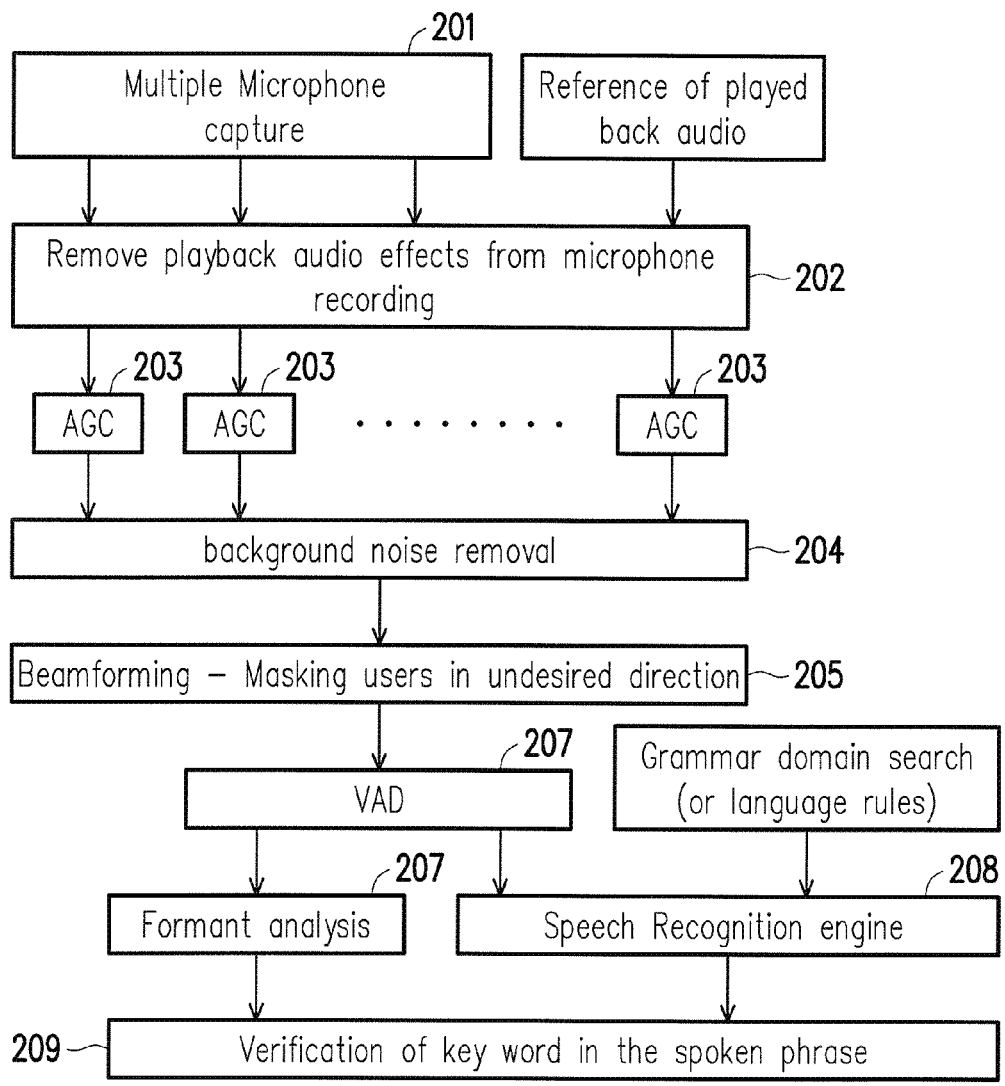
FIG. 2 illustrates a key word verification system in terms of a functional block diagram in accordance with one of the exemplary embodiment of the disclosure.

FIG. 2 illustrates a key word verification system in terms of a functional block diagram in accordance with one of the exemplary embodiment of the disclosure. The keyword verification system would be used to execute the steps described in FIG. 1 as well as all the exemplary embodiments. The keyword verification system would include not limited to a capturing module 201, an echo cancellation module 202, an automatic gain control (AGC) array module 203, a background noise removal module 204, a beamforming module 205, a voice activity detection (VAD) module 206, a formant analysis module 207, an ASR module 208, and a keyword module verification 209. Each or a combination of the modules could implemented by hardware integrated circuits (ICs) or by software/firmware implemented by a processing circuit or by a combination of hardware or software. The processing circuit may include be one or more central processing units (CPUs) (i.e. processors) or other types of controllers and programmable devices.

The capturing module 201 may include at least two microphones which are transducers that convert sound waves into analog electrical signals. The capturing module 201 may also have analog to digital converters which converts analog electrical signals into digital signals. The captured audio signals would be fed into the echo removal module 202.

The echo cancellation module 202 would receive audio signals from the capturing module 201 and would perform echo cancellation that is used to enhance the signals captured by the capturing module and to remove playback audio captured by the microphones and subsequently recorded. An implementation of the echo cancellation module 202 is further elucidated in FIG. 3.

The AGC array module 203 would receive signals from the echo cancellation module 202 and would increase or decrease audio volumes of the received signals from the echo cancellation module 202 in order to meet a required audio level for subsequent modules for additional processing. In other words, the AGC array module would be used to stabilize the gain of the signals received from the echo cancellation module 202. In this way, the use of AGC would allow the keyword verification system to have a better far-field capture and to enhance the signal to noise ratio of the input speech since the AGC could be configured to not boost noise signal. An upper threshold and a lower threshold could be imposed on a captured audio signal so that an AGC adjusted audio signal would be within a specific range. For example, when a captured audio signal is below the lower threshold, it could be considered to be background noise and be ignored. The input audio signal could be AGC adjusted to be centered at a particular level. For example, the adjusted audio signal could be centered at ¼ of the total dynamic range of the AGC. In this way, the conversion time could be decreased as adjusted audio signal is centered at a lower level of the dynamic range of the AGC.

Optionally, the keyword verification system may include a background noise removal module 204 which is configured to detect background noise and then remove the background noise. For example, the background noise removal module 204 may detect the frequency of a noise that is generated by a fan and then use a digital filter to remove such noise. The background noise removal module 204 may also be configured to remove white noise so as to enhance the signal to noise ratio of an audio signal.

The beamforming module 204 may receive the processed audio signals from the output of the background noise removal module 204 and perform beamforming processes. Beamforming refers to a linear microphone-array process in which the time difference between signals due to spatial difference of the microphones could be used to process or enhance or filter the audio signal. Beamforming primarily assumes that the geometry amongst the sensors and their orientations are known for the purpose of localizing the sound source. These techniques are methods for spatial filtering to track a beam towards a sound source and null out the other directions. The beamforming module 205 would be used when there are multiple microphones are available and is based on masking in time and frequency of sound sources in undesired directions. The desired and undesired directions are measured on basis of time delay of between sound waves arriving at the microphones. The desired direction of capturing sound is generally perpendicular to the plane of the microphone. Please refer to FIG. 5 and FIG. 6 for further details.

The VAD module 206 would receive processed audio signal from the beamforming module 205. The VAD module 206 would ignore the audio signal if it is lower than a specific threshold. Moreover, the VAD module 206 would only accepts the audio signal if it is human speech. A VAD module would be used when only interested audio signal is a human speech for applications like speech recognition, speech identification, and etc. The exact implementation of a VAD module is currently known by ordinary persons skilled in the art.

In response to being processed by the VAD module 206, the processed audio signal is passed through an ASR (automatic speech recognition) engine 208 by using a pre-designed grammar to increase the accuracy of keyword detections. The grammar for voice command system is expected to achieve requirements of high accuracy of trigger command recognition, high recognition rate of designed commands, and high reject rate of out of command speech. The formant analysis module 207 would receive the output of the VAD module 206 and perform the formant analysis of the processed audio signal. The keyword verification module 209 would receive the vowel pattern as well as the timestamp information of the vowels of each phoneme and would subsequently verify that the word(s) recognized by the ASR engine 208 is one of the key keywords in a keyword database.

Figure 3:
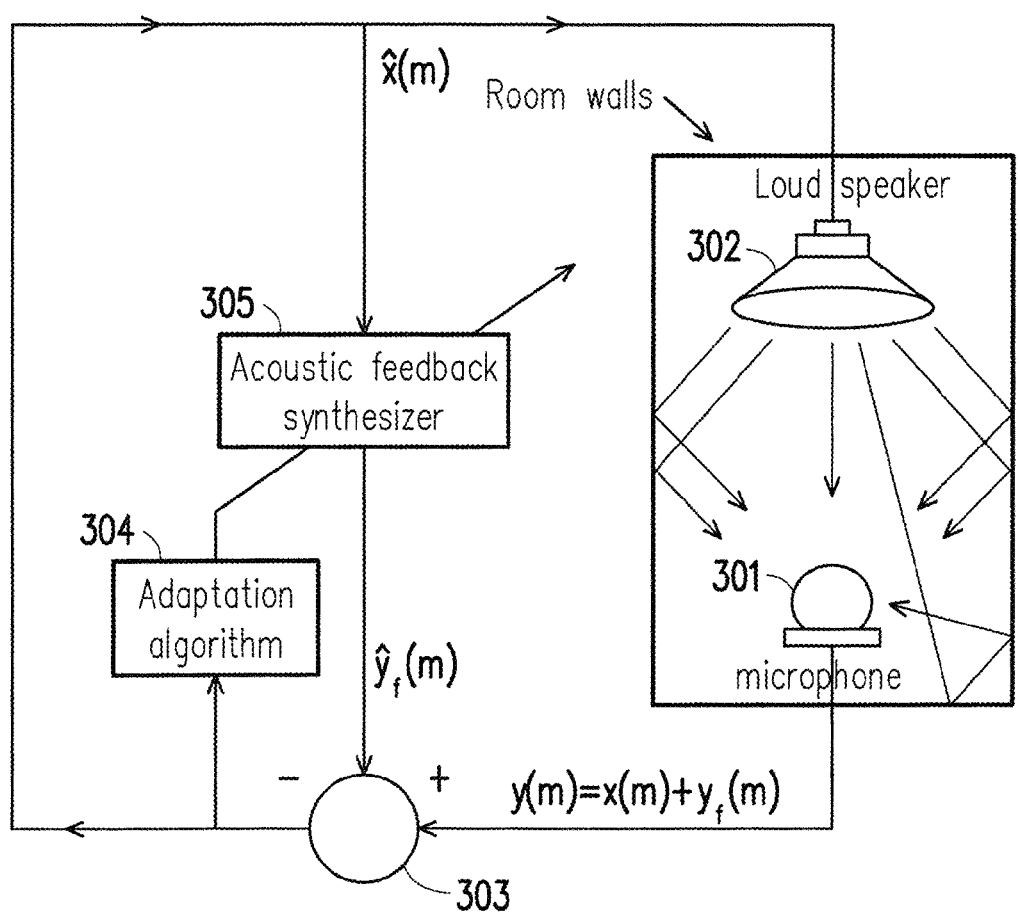
FIG. 3 illustrates an echo cancellation technique in accordance with one of the exemplary embodiment of the disclosure.

FIG. 3~FIG. 10 and their corresponding written descriptions serve elucidate the disclosure with further details. The FIG. 3 illustrates the processes performed by the echo cancellation module 202. As dual talk detection and removal involves development of a fast and accurate approximation of user speech from the mixture of machine sound (playback sound) and user speech, the implementation of such the echo cancellation module may help in applications involving the use of cleaned user speech for recognition and identification such as in a Robotic system. The cleaned speech might include a user command, a user's identification or a command identification, and etc. The idea is to combine good dual talk detection based on signal SNR in time with robust removal in time with the low distortion of echo cancellation obtained by the frequency domain echo canceller. First, the delay between the played back and recorded signal is estimated. This delay information would then be fed into time and frequency domain echo canceller. A time domain dual talk detector would detect dual talk (presence of played back and microphone signal) and would provide reference points to trigger filter adaptation.

Referring to FIG. 3 is further detail, it is assumed that a microphone 301 and a speaker 302 are situated in the same system enclosed by a room which may generate echo. The audio signal received by the microphone could be represented by $y(m)=x(m)+y_f(m)$ where $y(m)$ is the audio signal received by the microphone, $x(m)$ is the user's sound, and $y_f(m)$ is the sound of the speaker. $y_f(m)$ is the sound to be removed. The $y(m)$ would be subtracted by $\hat{y}(m)$ which is generated by the acoustic feedback synthesizer 305 which receives parameters from the adaptation algorithm 304. The result of the of subtraction would be an approximation of $x(m)$ which is then fed into the adaptation algorithm 304 as well as the acoustic feedback synthesizer 305 for the generation of $\hat{y}(m)$. The approximation of $x(m)$ is played by the speaker to be heard of the user.

Figure 4:
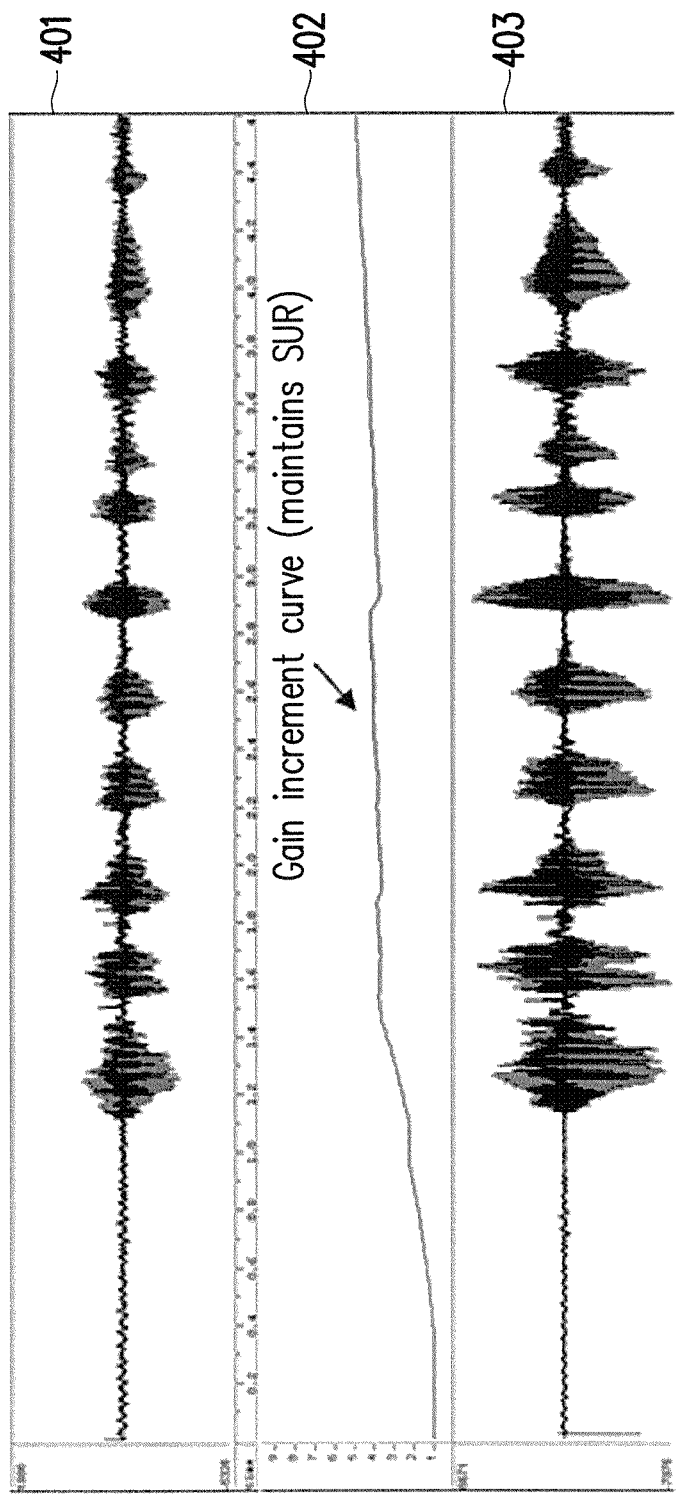
FIG. 4 contains a plot which illustrates using automatic gain control (AGC) to improve threshold accuracy in spatial direction of arrival of audio.

FIG. 4 contains a plot which illustrates using automatic gain control (AGC) to improve threshold accuracy in spatial direction of arrival of audio. The first plot 401 is an example of a processed audio signal which was captured by the capturing module 201 and processed by the echo cancellation module 202. The AGC array module would apply a gain characterized by the gain increment curve 402 in order to modify the processed audio signal within a specific power range. AGC (automatic gain control) is used to stabilize the gain of the input audio and allows for better far-field capture. After the gain has been applied, the result is shown by the second plot 403. It can be seen in FIG. 4 that the gain could be steadily increased or decreased to meet the target gain (volume) level. The processed audio can be seen to have a stable gain level which is predefined by keyword verification system. By applying AGC, as a user moves further away from the microphone, the volume can be increased to reach the predefined level. Also the AGC has an in-built noise cancellation functionality which could be optional for use.

FIG. 5 is a conceptual diagram that illustrates defining a cone having an acceptance angle and a capturing distance in accordance with one of the exemplary embodiments of the present disclosure. The capturing cone could be a three dimensional cone that captures audio signals within a certain space. However, for the ease of illustration, the capturing cone is assumed to be two dimensional. The exemplary capturing cone of FIG. 1B has an acceptance angle $\Phi_{d1}$ at the maximum distance denoted by x=L and an acceptance angle $\Phi_{d2}$ at x=0. The distance L is the maximum distance beyond which audio signals would be ignore by the audio capturing system. The maximum distance could be, for example, 1 meter. The distance x=0 could be defined to be right at the two microphones or right at a place displaced by a certain distance. The range of the acceptance angles $\Phi_{d1}$ and $\Phi_{d2}$ could be, for example, about 30 degrees. The angle $\Phi_{d1}$=0 or $\Phi_{d2}$=0 could be defined as to be in perfect alignment with the two speakers 501a 501b. The audio signals within the range of acceptance angles $\Phi_{d1}$ and $\Phi_{d2}$ would be considered as valid input audio signals, and the audio signals outside of the acceptance angles $\Phi_{d1}$ and $\Phi_{d2}$ would be masked or filtered out.

Figure 6:
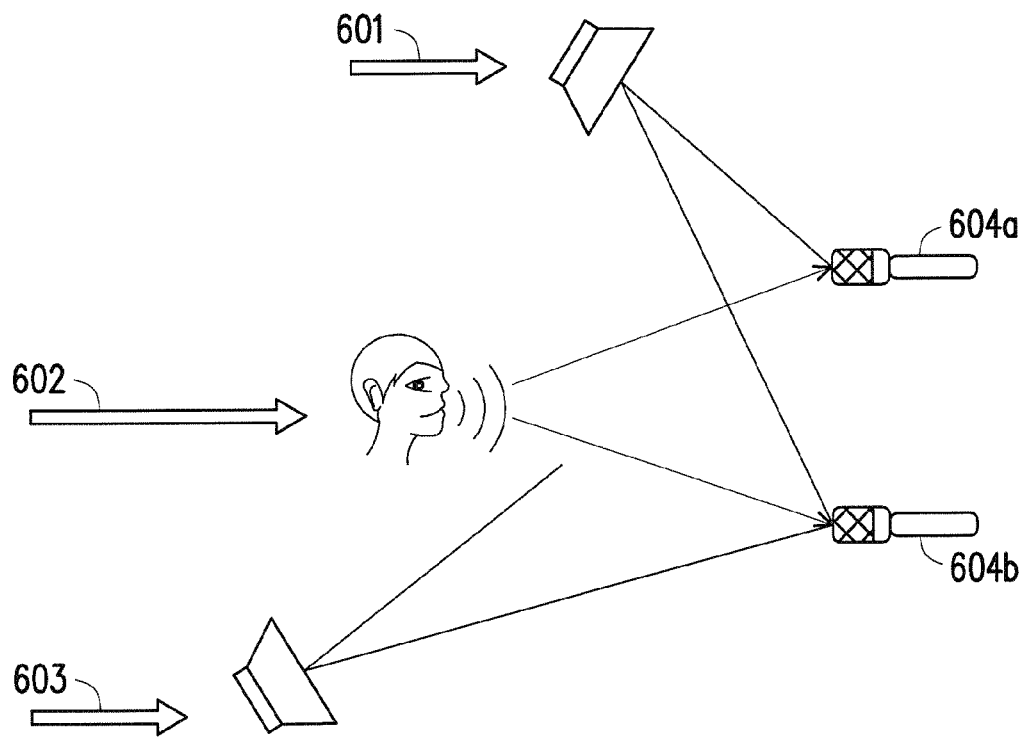
FIG. 6 is a conceptual diagram that illustrates filtering based on desired or undesired sources in accordance with one of the exemplary embodiments of the present disclosure.

The capturing distance, x, could be measured on the basis of signal strength and the confidence of an angle measurement. The signal strength and the angle measurement confidence would lower as a source moves further and further away from the microphones 501a and 501b. When the capturing distance, x, exceeds L, the audio source could be discarded. The angle of a source could be measured based on the TDOA principle. For example, if a source is at a location that is equal distance to both microphones 501a and 501b, the source would be received by both microphones 501a and 501b with almost no delay. If the source is displaced toward one of the microphones (e.g. 501a or 501b) but away from the other, one of the microphones 501a or 501b would receive the audio signal sooner than the other. On the basis of the differences in delay of the audio signals, the direction of the source could be calculated so that the beamforming module 205 may know whether a source is within the range of acceptance angles $\Phi_{d1}$ and $\Phi_{d2}$ FIG. 6 is a conceptual diagram that illustrates filtering based on desired or undesired sources in accordance with one of the exemplary embodiments of the present disclosure. For the exemplary scenarios of FIG. 6 is assumed to include at least three sources, the first source 601, the second source 602, and the third source 603. However, it would apparent for an ordinary person one skilled in the art that more than 2 microphones could be used to capture speech signals. The first source 601 and the third source 603 could include both human and non-human source such as a speaker broadcasting music mingling with human speech while the second source 602 is assumed to be a desired human speech. Naturally, the microphone 604a 604b would capture all three sources 601~603; however, this might not be what is intended as a user of the audio capturing system might only be interested in a dominant source or sources that are aligned with the microphones or are closest to the microphones. By eliminating unintended sources 601 603 which fall outside of the predefined capturing angle. The beamforming module of 205 would significantly improve the audio signal by reducing the captured noise.

Figure 7:
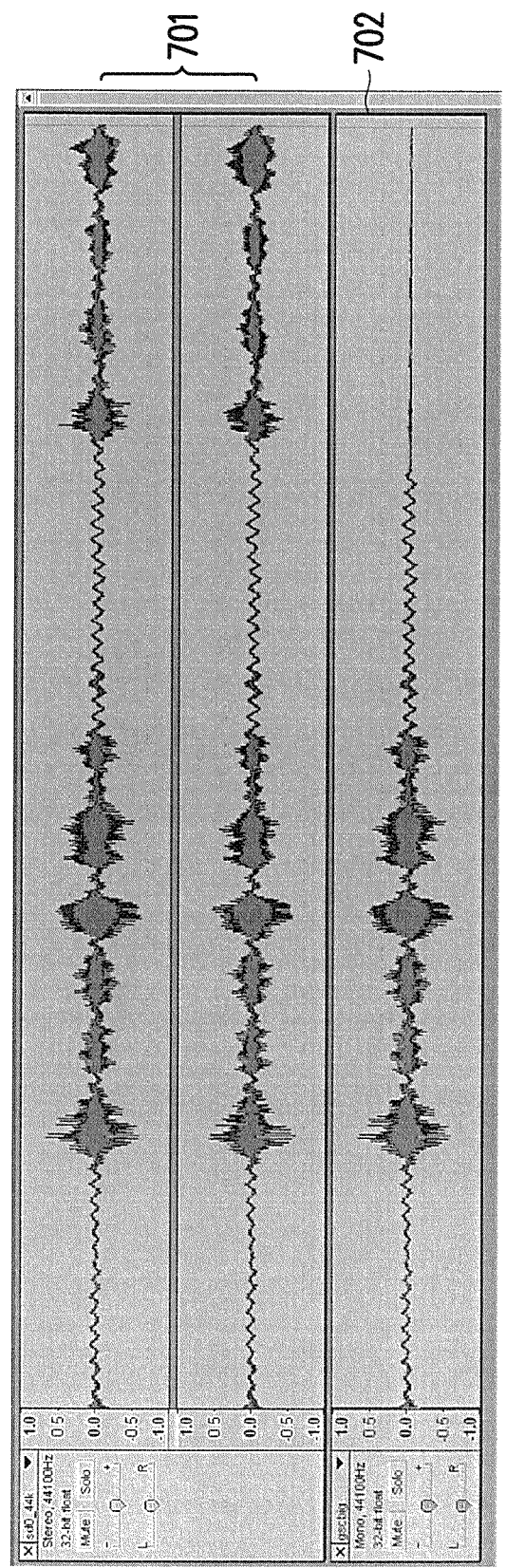
FIG. 7 illustrates the result of using beam bream forming to filter out undesired user direction.

FIG. 7 illustrates the result of using bream forming to filter out undesired user direction. The first two plots 701 of FIG. 7 are audio signals in the time presented in the time domain and illustrates the left channel and the right channel of processed audio signal without beaming forming. The third plot 702 of FIG. 7 illustrates the use of beam forming to eliminate audio noise that is outside of the angle of acceptance.

Figure 8:
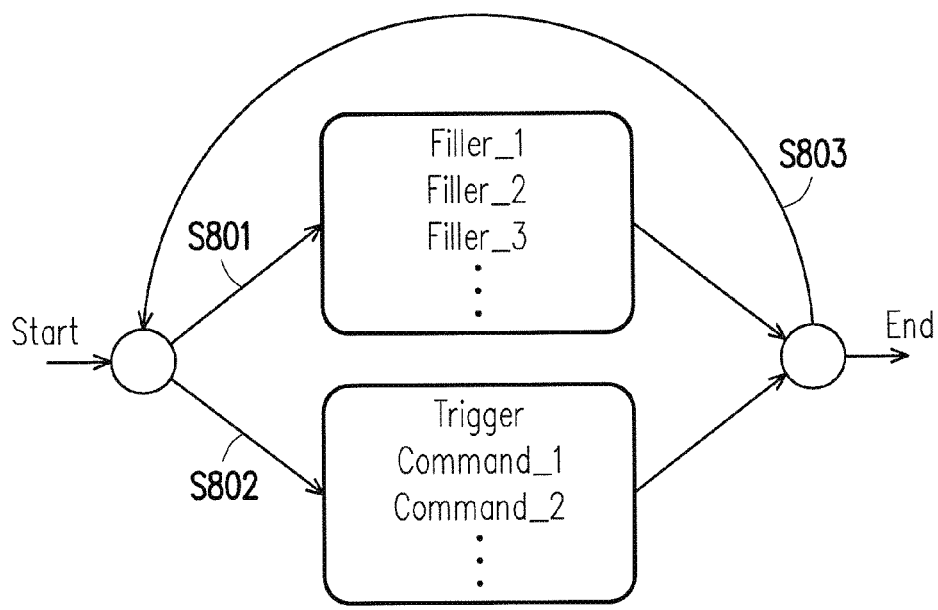
FIG. 8 is a diagram which illustrates a keyword verification procedure in accordance with one of the exemplary embodiments of the present disclosure.

FIG. 8 is a diagram which illustrates a keyword verification procedure in accordance with one of the exemplary embodiments of the present disclosure. FIG. 8 illustrates an example of the structure of a machine grammar. The artificial machine grammar includes different commands, a trigger word to start accepting a command, fillers and a back loop. The trigger word and the commands could be contained in a keyword library. Each command and filler could be given a weight which could be different for each command and filler and could be adjustable. Better performance could be achieved by empirically adjusting these weights. A trigger word, which could be any word, is a predefined word serving as a special command which is required for the electronic device to begin accepting commands. In this way, an electronic device would not accept any commands until the trigger word has been detected such that the electronic device would avoid being influenced by mundane human conversations which are not meant to control the electronic device.

The keyword library may further contain a set of filler words with a special weight assigned to each filler word in order to enhance the recognition accuracy of the keyword verification module 209. For the purpose of dealing with the out of vocabulary speech, beside the commands, the set of filler words could be integrated into the grammar to accept out of command sentences. A filler could be considered as a phoneme combination that might represent a word which could then be used to compose words or sentences. Also, in order to detect an entire out of vocabulary utterance, loops could be added to the grammar so that the fillers could be dynamically composed to faun the recognized text.

When an audio signal has been received, a series of recognized words would be accepted by the terms in the grammar. As shown in FIG. 8, after a word has been recognized by an ASR engine, the keyword verification module 209 would categorize the word as a first category 804 or a second category 805. The first category 804 would at least contain words that are fillers, and the second category would at least contain words that are trigger word and commands. Thus, as shown in FIG. 8 for example, the keyword verification module 209 would perform either S801 or step S802 to categorize a recognized word as either the first category 803 or the second category 804. In step S803, a loop could be used to provide the ability to produce different sequences from the grammar. Finally, a combination of fillers and commands would be generated to form the recognized text which may subsequently be used for detecting key words/phrase.

Figure 9:
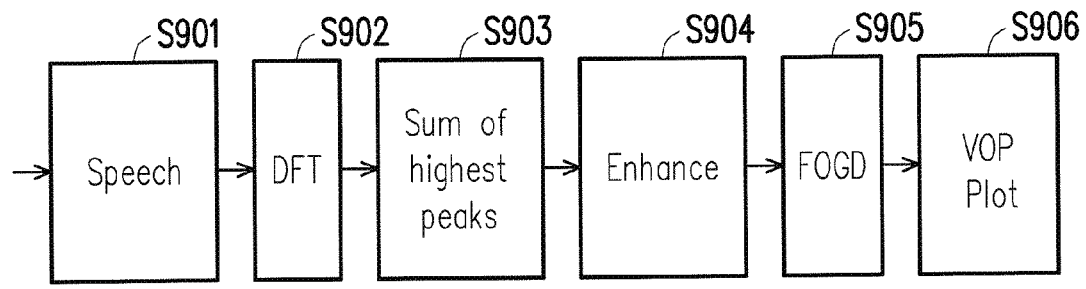
FIG. 9 illustrates various plots of the results of VOP detection using energy of spectral peaks for utterance.
Figure 10:
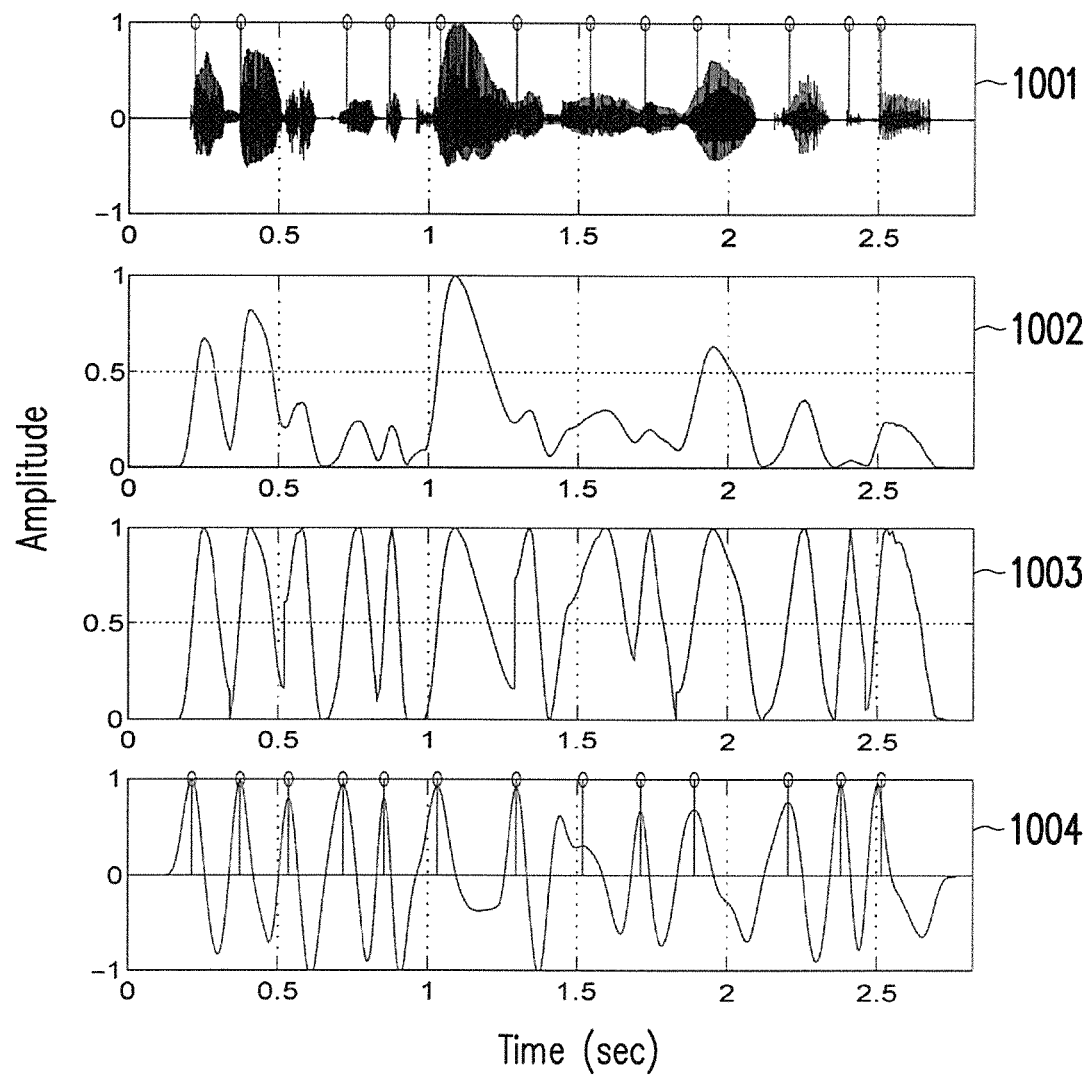
FIG. 10 illustrates the algorithm of VOP detection using energy of spectral peaks in accordance with one of the exemplary embodiments of the present disclosure.

FIG. 9 illustrates the algorithm of vowel onset point (VOP) detection by using energy of spectral peaks for the purpose of detecting vowel onset locations in accordance with one of the exemplary embodiments of the present disclosure. The algorithm of FIG. 9 could be used by the formant analysis module 207. FIG. 10 illustrates various plots of the results of VOP detection using energy of spectral peaks for utterance. In general, a formant analysis would include detection of formants and vowel onset points. By using the exact time location of vowel onset points, similarity groups could be formed. Referring to FIG. 9 and FIG. 10 together, in step S901, the formant analysis module 207 may receive a processed and digitized input speech signal, and in step S902 the input speech signal would first be transformed using Fourier Transform (e.g. Discrete Fourier Transform). An example of such plot is show in the first plot 1001 of FIG. 10.

In step S903, after the spectral peaks (e.g. 10 largest peaks) are located, the spectral peaks would be summed. The second plot 1002 of FIG. 10 shows the sum of N largest peaks of the first plot 1001. In step S904, the result is then enhanced by using normalization by scaling each of the peaks to a specific magnitude. The third plot 1003 of FIG. 10 shows the enhanced sum of N largest peaks. In step S905, the output of step S904 would undergo a convolution with the first order Gaussian differentiator (FOGD) in order to generate the VOP plot of step S906. The four plot 1004 of FIG. 10 shows the result of the VOP plot of step S906. From FIG. 10, it could be seen that the process steps start with spectral peaks, peak enhancement and the final VOP plot after FOGD has been carried out. From the VOP plot, the vowel onset location could be located. By further using the formant information, vowels could be categorized into similar groups by grouping vowels with similar formant frequencies together into the same category.

Figure 11:
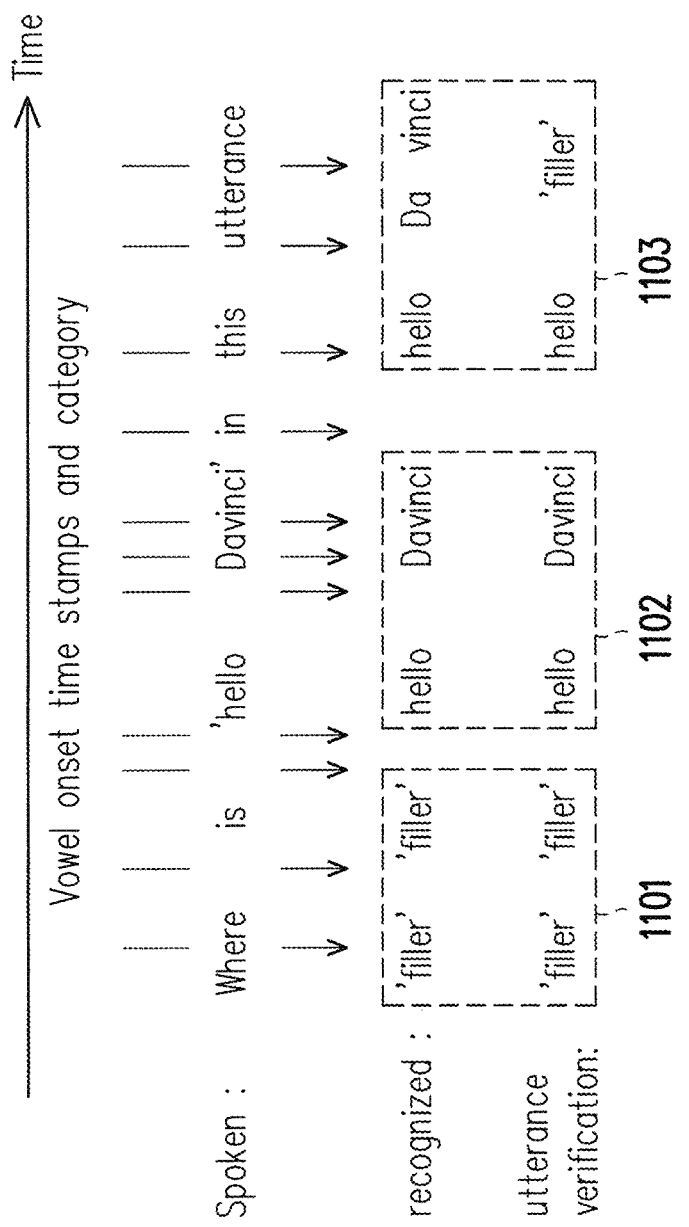
FIG. 11 illustrates an example of the keyword detection method in accordance with one of the exemplary embodiments of the present disclosure.

FIG. 11 illustrates an example of the keyword detection method in accordance with one of the exemplary embodiments of the present disclosure. By using the information from formant analysis performed by the formant analysis module 207 and phoneme time-stamp information from the speech recognition engine 208, whether a keyword has been correctly spotted by an ASR engine could be verified. The aim of the keyword verification module 209 would be to reduce the number of false detections of key words or phrases by the keyword verification system. The principle of operation of the keyword verification module 209 could be further be elucidated by the following example.

From the formant analysis performed by the formant analysis module 207, the vowel onset location (i.e. time stamp) and the vowel's category could be located. The vowel categories are based on the vowel set as per International phoneic alphabet set. But for illustration purposes, the vowel categories could be "a", "e", "i", "o", and "u" for example. By having the vowel onset location and the vowel's category, keyword verification module 209 can verify whether a word detected by the ASR engine 208 would match a keyword from a keyword database. The verification is determined based on one or two criteria or a combination of both. The first criteria is whether the vowel sequence of a word matches with the vowel sequence of a keyword from a keyword database. The second criteria is whether the time stamp of each vowel appears within an expected time range.

Suppose that a word "Davinci" was spoken and detected by the ASR engine 208, and "Davinci" is a keyword from a keyword database, the first criteria is used to determine whether vowel sequence of "Davinci" detected by the formant analysis module 207 would match with the vowel sequence of the word "Davinci" in the keyword database. For the word "Davinci", the correct vowel sequence is required to be "a", "i", and "i", and thus if any other vowel sequence other than what is required has been detected by the formant analysis module 207, then the word which was detected by the ASR engine would have been deemed to be not "Davinci" and thus the word detected by the ASR engine would then be categorized as a "filler" word by the keyword verification module even if such conclusion would contradict the result of the ASR engine.

By applying the second criteria, if the time stamp information of the formant analysis module 207 revealed that any of the vowels "a", "i", and "i" are separated by a time exceeding beyond a specific threshold, then the word which was detected by the ASR engine would have been deemed to be not "Davinci" and thus the word detected by the ASR engine would then be categorized as a "filler" word by the keyword verification module even if such conclusion would contradict the result of the ASR engine. Only by satisfying both the first criteria and the second criteria, the word detected by the ASR engine to be "Davinci" would indeed by "Davinci" as one of the keywords in the keyword database.

For another example, suppose that an utterance by a user is "where is hello davinci in this utterance". It is further supposed that a key phrase contained in the keyword database is 'hello davinci'. In this example the recognized text is "filler filler hello da vinci hello da vinci filler". For this example, it is supposed that 'filler' is a default output when a word not contained in the keyword database has been detected. Therefore, it can be seen that the output as recognized by the ASR engine 208 has been partially incorrect. In this example, it is clear that the location of the second phrase "hello davinci" is incorrect, and the second occurrence of "hello davinci" could be due to an echo. However, the second occurrence of "hello davinci" could be detected as incorrect by recognizing the mismatch in the vowel onset location. In other words, in this example, the timestamp of the vowels as detected by the formant analysis module 207 does not measure up in comparison to the timestamp of the vowels as detected by the ASR engine 208. Thus, based on the example above, it can be seen that the keyword verification module 209 would reduce the probability of false detection significantly.

In view of the aforementioned descriptions, the disclosure is suitable for being used in an electronic device and is able to verify keywords from words recognized by an ASR engine for the purpose of storage, transmission, speech recognition, or speaker identification of keywords.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A directional keyword verification method applicable to an electronic device, the method comprising:
   receiving a first audio stream within a predefined angle and eliminating noise from any direction which is not within the predefined angle, wherein receiving the first audio stream comprising:
     capturing the first audio stream by using at least two microphones;
     applying an echo cancellation procedure to the first audio stream; and
     applying an automatic gain control (AGC) to the first audio stream to generate a gain adjusted first audio stream that is within a predetermined power level;
   analyzing the first audio stream to obtain a first word;
   determining whether the first word matches a first keyword from a keyword database;

assigning the first word as belonging a first category in response to the first word being determined as not matching the first keyword from the keyword database;

determining whether a vowel pattern of the first word matches the vowel pattern of the first keyword in response to the first word being determined as matching the first keyword from the keyword database;

assigning the first word as belonging to a second category in response to the vowel pattern of first word being determined as matching the vowel pattern of the first keyword; and assigning the first word as belonging to the first category in response to the vowel pattern of first word being determined as not matching the vowel pattern of the first keyword.

2. The method of claim 1, wherein determining whether the vowel pattern of the first word matches the vowel pattern of the first keyword comprising:

determining the vowel pattern of first word to be matching the vowel pattern of the first keyword in response to:
a vowel sequence of the first word matching exactly with a vowel sequence of the first keyword; and
a timestamp of a vowel of the vowel sequence of the first word falls within an expected range which is determined based on a corresponding vowel of the vowel sequence of the first keyword.

3. The method of claim 2, wherein determining whether the first word matches a first keyword from a keyword database comprising:

dividing the first audio stream into phonemes;
performing a formant analysis of the phenomes to detect formants and the time stamp of the vowels; and
verifying the first word based on the formants and the time stamp of the vowels.

4. The method of claim 1, wherein the first category is a filler word, and the second category is a trigger word or a command word.

5. The method of claim 1, wherein assigning the first word as belonging to the second category further comprising:

determining whether the first word is a trigger word; and
determining whether the second word matches a second keyword which is a command word from the keyword database only if the first word is determined to be the trigger word.

6. The method of claim 1 further comprising:
receiving a second audio stream;
performing a voice activity detection (VAD) procedure to determine whether the audio stream is a human speech; and
discarding the second audio stream if the audio stream is not a human speech.

7. The method of claim 1 further comprising:
calculating a linear predictive coding (LPC) residue of the gain adjusted first audio stream;
determining from the LPC residue a direction of the first audio stream relative to the at least two microphones based on time difference of arrival (TDOA); and
masking any sound at any direction that is outside of the predefined angle.

8. The method of claim 7, wherein masking any sound source at any direction that is outside of the predefined angle comprising:

filtering out any sound that is outside of the predefined angle; and
filtering out any sound that is beyond a maximum distance.

9. The method of claim 1, wherein analyzing the first audio stream to obtain a first word comprising:

analyzing the first audio to detect the first word from a first angle; and
analyzing the first audio to detect a different word from a second angle.

10. An electronic device comprising:
at least two microphones; and
a processor indirectly coupled to the at least two microphones and is configured at least for:
receiving, by using the at least two microphones, the first audio stream within a predefined angle and eliminating noise from any direction which is not within the predefined angle, wherein the processor is configured at least for receiving the first audio stream comprising:
capturing the first audio stream by using at least two microphones;
applying an echo cancellation procedure to the first audio stream; and
applying an automatic gain control (AGC) to the first audio stream to generate a gain adjusted first audio stream that is within a predetermined power level;
analyzing the first audio stream to obtain a first word;
determining whether the first word matches a first keyword from a keyword database;
assigning the first word as belonging a first category in response to the first word being determined as not matching the first keyword from the keyword database;
determining whether a vowel pattern of the first word matches the vowel pattern of the first keyword in response to the first word being determined as matching the first keyword from the keyword database;
assigning the first word as belonging to a second category in response to the vowel pattern of first word being determined as matching the vowel pattern of the first keyword; and
assigning the first word as belonging to the first category in response to the vowel pattern of first word being determined as not matching the vowel pattern of the first keyword.

11. The electronic device of claim 10, wherein the processor is configured at least for determining whether the vowel pattern of the first word matches the vowel pattern of the first keyword comprising:

determining the vowel pattern of first word to be matching the vowel pattern of the first keyword in response to:
a vowel sequence of the first word matching exactly with a vowel sequence of the first keyword; and
a timestamp of a vowel of the vowel sequence of the first word falls within an expected range which is determined based on a corresponding vowel of the vowel sequence of the first keyword.

12. The electronic device of claim 11, wherein the processor is configured at least for determining whether the first word matches a first keyword from a keyword database comprising:

dividing the first audio stream into phonemes;
performing a formant analysis of the phonemes to detect formants and the time stamp of the vowels; and
verifying the first word based on the formants and the time stamp of the vowels.

13. The electronic device of claim 10, wherein the first category is a filler word, and the second category is a trigger word or a command word.

14. The electronic device of claim 10, wherein the processor is configured at least for assigning the first word as belonging to the second category further comprising:
   determining whether the first word is a trigger word; and
   determining whether the second word matches a second keyword which is a command word from the keyword database only if the first word is determined to be the trigger word.

15. The electronic device of claim 10, wherein the processor is further configured at least for:
   receiving a second audio stream;
   performing a voice activity detection (VAD) procedure to determine whether the audio stream is a human speech; and
   discarding the second audio stream if the audio stream is not a human speech.

16. The electronic device of claim 10 is further configured at least for:
   calculating a linear predictive coding (LPC) residue of the gain adjusted first audio stream;
   determining from the LPC residue a direction of the first audio stream relative to the at least two microphones based on time difference of arrival (TDOA); and
   masking any sound at any direction that is outside of a predefined angle.

17. The electronic device of claim 16, wherein the processor is configured at least for masking any sound source at any direction that is outside of the predefined angle comprising:
   filtering out any sound that is outside of the predefined angle; and
   filtering out any sound that is beyond a maximum distance.

18. The electronic device of claim 10, wherein the processor is configured at least for analyzing the first audio stream to obtain a first word comprising:
   analyzing the first audio to detect the first word from a first angle; and
   analyzing the first audio to detect a different word from a second angle.

* * * * *